United States Patent
Hansson et al.

[11] Patent Number: 5,256,008
[45] Date of Patent: Oct. 26, 1993

[54] CUTTING TOOL FOR A PEELING OPERATION

[75] Inventors: Sölve Hansson; Yngve Dahllöf, both of Sandviken, Sweden

[73] Assignee: Sandvik AB, Sandviken, Sweden

[21] Appl. No.: 845,655

[22] Filed: Mar. 4, 1992

[30] Foreign Application Priority Data

Mar. 4, 1991 [SE] Sweden ................................. 9100621

[51] Int. Cl.$^5$ .............................................. B23B 5/12
[52] U.S. Cl. ........................................ 407/33; 82/130; 407/113
[58] Field of Search ................... 82/130; 407/30, 33, 407/113, 114, 103; 409/139; 408/203.5

[56] References Cited

U.S. PATENT DOCUMENTS

| | | |
|---|---|---|
| 3,271,842 | 9/1966 | Breuning ..................... 407/103 X |
| 3,813,748 | 6/1974 | Lindemann . |
| 3,896,532 | 7/1975 | Brooks . |
| 4,035,888 | 7/1977 | Romagnolo . |
| 4,252,480 | 2/1981 | Mizuno et al. . |

FOREIGN PATENT DOCUMENTS

| | | |
|---|---|---|
| 0131784 | 1/1985 | European Pat. Off. ............. 82/130 |
| 0160850 | 11/1985 | European Pat. Off. . |
| 3540665 | 5/1987 | Fed. Rep. of Germany . |
| 2359667 | 2/1978 | France . |
| 2483277 | 12/1981 | France ................................. 82/130 |
| 2483819 | 12/1982 | France . |

*Primary Examiner*—Steven C. Bishop
*Attorney, Agent, or Firm*—Burns, Doane, Swecker & Mathis

[57] ABSTRACT

A tool for bar peeling of solid or hollow bars includes a rotatable cutter head and a plurality of toolholders distributed around its periphery. Each toolholder is provided with a roughing insert and a finishing insert. The edge surface of each roughing insert intersect with the top surface to define three separate cutting edges whereby adjacent pair of these edges intersect at obtuse angles ranging from 120–140 degrees. The cutting edges of the roughing insert are convexly curved, whereas the cutting edges of the finishing insert are basically linear.

20 Claims, 2 Drawing Sheets

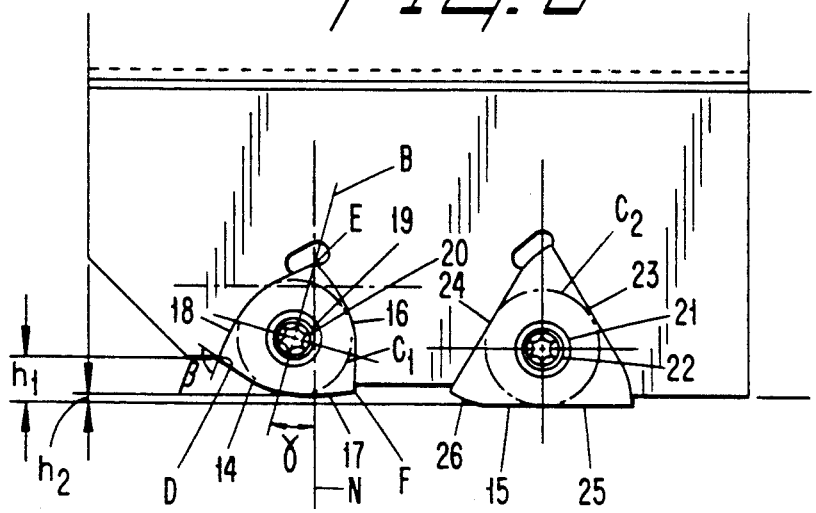
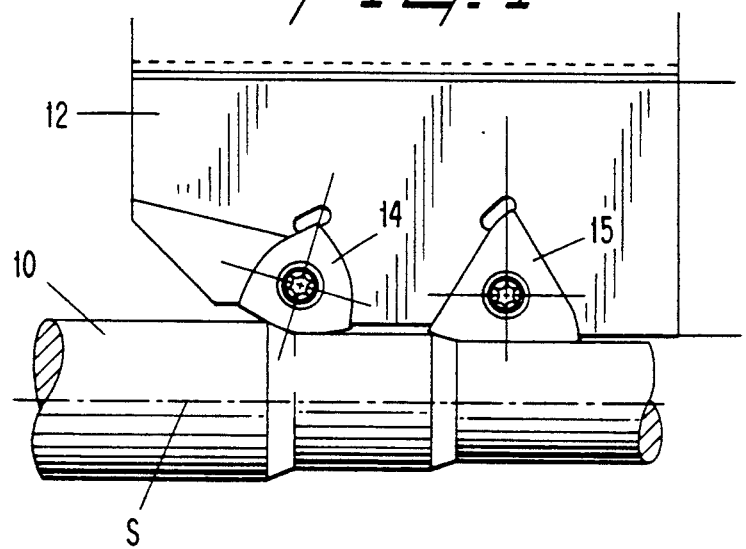
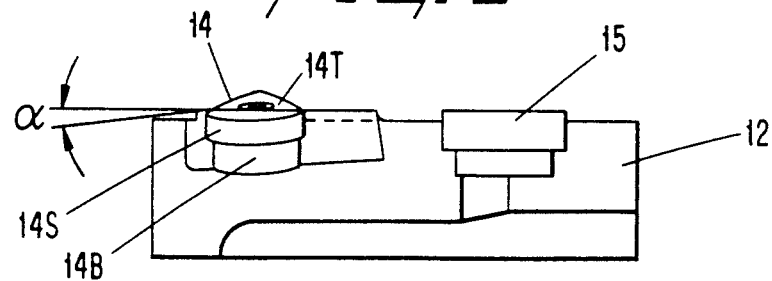

CUTTING TOOL FOR A PEELING OPERATION

BACKGROUND OF THE INVENTION

The present invention relates to a cutting tool for turning operations. More specifically, the invention relates to a cutting tool for a bar peeling operation performed on solid or hollow bars formed of stainless steel or other heat resist materials. The cutting tool comprises a holder equipped with one or several inserts of a polygonal form including an upper chip face, an opposite bottom face and a clearance face located therebetween, whereby the intersection of the chip face and the clearance face forms a cutting edge.

Bar peeling as a metalworking operation means that a non-rotatable bar is axially displaced through a central hole of a rotary cutter head. The cutter head is provided with several tools which remove from the bar a thin layer of millscale, surface cracks, etc., that results from the hot rolling of such bars or tubes. In order to achieve the best results regarding tolerances and surface finish, two different types of inserts, i.e., roughing and finishing inserts, are usually combined in the same holder. One of the most commonly used inserts for bar peeling is a so-called trigonal inserts as shown and described in U.S. Pat. No. 4,035,888. That insert is in the form of a regular polygonal body the corners of which are configured symmetrically about a corner bisector. Such inserts, however, have somewhat limited utility because they do not enable desired results to be achieved when large feeds are involved.

In view thereof, it is a purpose of this invention to provide a new type of cutting tool with an insert having continuously convexly curved cutting edge portions, to be used together with subsequent wiper inserts at large cutting depths.

It is another purpose of the invention to provide an insert with an extended lifetime.

It is yet another purpose of the invention to provide an insert which allows favorable chipbreakers thereon to be used for both large and small cutting depths at large feeds. It is yet another purpose of the invention to provide an insert having a short contact surface towards the workpiece which can reduce the tendency for vibrations to occur during a cutting operation.

SUMMARY OF THE INVENTION

The present invention involves a cutting tool for bar peeling operations, as well as a tool holder for use in such a cutting tool. The cutting tool comprises a rotatable cutter head equipped with a plurality of tool holders. Each of the tool holders carries both a multi-cornered polygonal roughing insert of wear-resistant material, and a finishing insert. Each of the roughing and finishing inserts include top and bottom surfaces and peripheral surfaces extending therebetween. The edge surfaces intersect the top and bottom surfaces to form cutting edges. The roughing insert has three separate and convexly curved cutting edges, wherein each cutting edge forms two obtuse-angled corners with two others of the cutting edges.

Preferably, the three cutting edges of the roughing insert are symmetrical disposed relative to a geometric center of the roughing insert.

Those three cutting edges are preferably intersected by a common imaginary circle inscribed within the insert such that three tangents drawn at such point of intersection form an equilateral triangle.

Each of the finishing inserts is generally triangular, having three cutting edges. The cutting edges are symmetrical relative to a geometric center of the finishing insert.

Each of the cutting edges of the finishing insert includes a linear main portion and a linear secondary portion. The secondary portion is inclined relative to the main portion and is shorter than the main portion. Each corner of the finishing insert is formed by a main portion of one cutting edge and a secondary cutting portion of another cutting portion.

BRIEF DESCRIPTION OF THE DRAWINGS

The objects and advantages of the invention will become apparent from the following detailed description of a preferred embodiment thereof in connection with the accompanying which like numerals designate like elements, and in which:

FIG. 3 is an enlarged plan view of a toolholder in FIG. 2 equipped with inserts according to the invention;

FIG. 4 is a plan view of a toolholder with inserts of this invention in engagement with a workpiece; and FIG. 5 is a side view of a toolholder as shown in FIG. 2.

DETAILED DESCRIPTION OF A PREFERRED EMBODIMENT OF THE INVENTION

Figure 1:
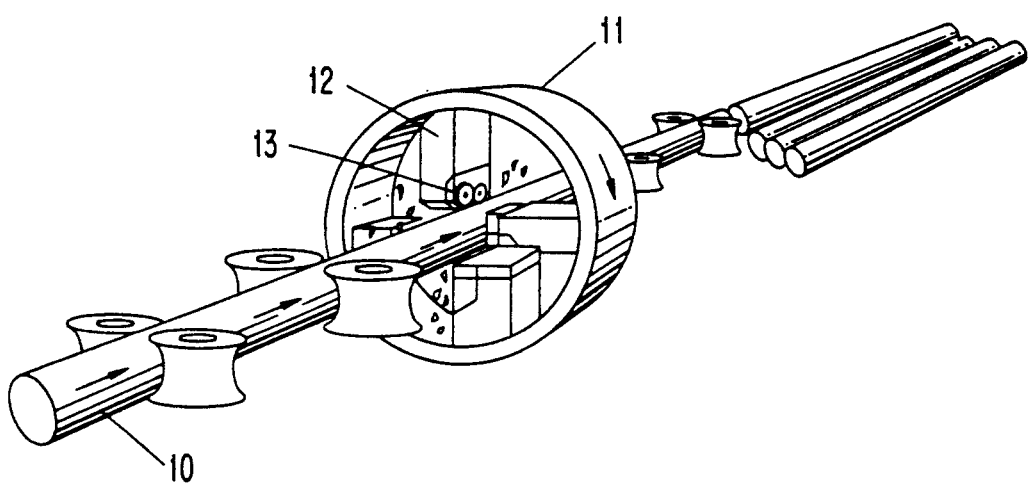
FIG. 1 is a perspective view of a conventional cutting tool for bar peeling.
Figure 2:
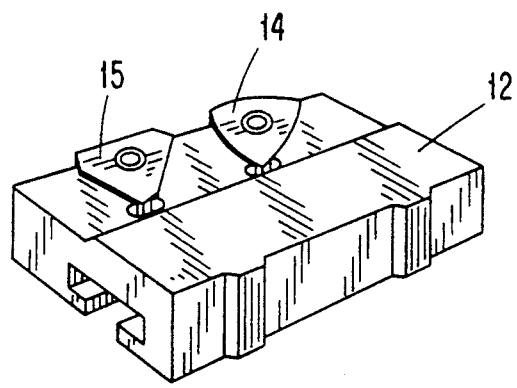
FIG. 2 is a perspective view of a toolholder for bar peeling provided with inserts according to the invention.

In FIG. 1 there is shown a cylindrical bar 10 which is intended to be the subject of a bar peeling operation by a rotary cutting head 11 equipped with a plurality of radially extending toolholders 12, each of which is carrying two inserts 13 of cemented carbide or similar hard and wear resistant material. The head 11 rotates about an axis 5, which coincides with the axis of the workpiece. As appears from FIGS. 2-4 the cutting tool of this invention includes a toolholder 12 that is provided with a roughing insert 14 intended for roughing operations to cutting depth $h_1$ and a finishing or wiper insert 15 provided at a certain longitudinal distance from said roughing insert 14 while intended to provide the finished surface at cutting depth $h_2$.

As appears from FIG. 5 the roughing insert 14 is inclined in relation to the horizontal plane of the tool holder 12 at an angle, i.e., its front side (left in FIG. 5) is lower than its rear side (right in FIG. 5). This angle $\alpha$ usually amounts to 2-14 4°, and at the same time the roughing insert is tilted forwardly at the same angle $\alpha$, i.e., it is inclined in a direction that is perpendicular from said first tilting direction, whereby the side of the insert located closest to the viewer in FIG. 5 is lower than the side located farthest from the viewer.

In accordance with the invention, the roughing insert is provided with top and bottom surfaces 14T, 14B which are intersected by three side surfaces 14S. The intersection of the side surfaces with the top surface forms three distinct, continuously convexly curved cutting edges 16, 17, 18, with the edge 17 being in cutting engagement with a workpiece in FIG. 3. The insert has a central aperture 19 for the receipt of a central locking screw 20 or a lever. In the alternative, the insert could be compact and secured by means of a clamp acting towards its top surface.

It is characteristic that the roughing insert 14 has a negative basic shape, i.e., its top and bottom surfaces are oriented perpendicularly in relation to the edge surfaces located between said top and bottom surfaces. The curvature of the convexly curved cutting edges 16, 17, 18 is such that all of these edges are intersected at their midpoints by an inscribed imaginary circle $C_1$, whose center corresponds to the geometric center of the insert. In other words, three tangents drawn at those three points of intersection, respectively, would form an equilateral triangle. Thus, the cutting edges 16, 17, 18 are symmetrical about the geometric center of the insert. The two edges 17 and 18 intersect at a corner D to form an obtuse angle $\beta$ in the range of 120–140°. The corner area is smoothly rounded at a certain radius. The cutting edges 18 and 16 intersect in the same manner at a corner E, and cutting edges 16 and 17 are similarly intersecting at the same angle $\beta$ in a corner F.

The bisector B of the radially innermost corner E (i.e., the corner located farthest from the workpiece) forms an acute angle $\delta$ with a normal N which extends perpendicularly to the workpiece, i.e., which forms a right angle with the central line or axis of symmetry S (see FIG. 4) of the workpiece. In this case, the workpiece is a cylindrical bar 10 with which the insert 14 engages. The size of this angle $\delta$ should be 5–25°, preferably 10–25°.

The finishing insert 15, located at a distance from the roughing insert 14, is triangularly formed and, similarly to the roughing insert, is provided with a central aperture 21 for the receipt of a correspondingly dimensioned center screw 22. The finishing insert has three straight main cutting edges 23, 24, 25 which are tangent to an imaginary internal circle $C_2$ of the same diameter as circle C. The cutting edges 23, 24, 25 are symmetrical with respect to the geometric center of the insert.

It is characteristic that each corner of this finishing insert is provided with a linear secondary cutting edge. The main edge engaging the workpiece in FIG. 3 is designated 2 and the adjacent secondary cutting edge is designated 26. The main cutting edge 25 is inclined at an angle of 10–20° in relation to the direction of the secondary cutting edge 26. The finishing insert 15 is arranged such that its top face lies in a plane which corresponds to, or is parallel to, the top surface of the holder 12 (see FIG. 5).

It is to be understood that the finishing insert 15 could have a shape other than triangular. The insert 15 could for instance have a so-called trigonal form, i.e., an insert with angularly broken edges such as shown in U.S. Pat. No. 4,035,888. An important aspect when selecting the form of the finishing insert is that secondary cutting edge is linear.

As a general rule for the dimensioning of the roughing insert 14, it has been found suitable to provide the curved edges of the insert 14 with a radius that substantially corresponds to the diameter of the circle $C_1$ inscribed in the insert.

It has been discovered that a bar peeling tool equipped with toolholders with one or more such inserts 14 as described above enables a favorable reduction or even elimination of the difficulties initially referred to as inherent with prior art tools. By providing such a roughing insert 14 with a larger abutment surface for seating in the toolholder, and by achieving a more stable abutment, preferably by arranging the center axis of the clamping screw 20 eccentrically displaced from the center of the insert hole 19, larger bar peeling depths are achieved as well as increased mechanical strength of the insert. Thanks to the arrangement of a roughing insert 14 having such a large radius for each cutting edge 16, 17, 18, a good surface finish at reduced sensitivity to vibrations is also achieved.

In comparison with an entirely round insert, the present insert achieves a more fixed clamping which eliminates the risk for undesired rotation of the insert. Because the setting angle is varying from a certain angle value down to 0°, the life of the insert can be substantially improved at intermittent machining of a workpiece.

Although the invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A cutting tool for bar peeling operations, comprising a rotatable cutter head equipped with a plurality of toolholders, each of said toolholders carrying both a multi-cornered polygonal roughing insert of wear resistant material, and a finishing insert, each of said roughing and finishing inserts including top and bottom surfaces and peripheral side surfaces extending therebetween, said side surfaces of each insert intersecting one another to define corners of said insert, said side surfaces of each insert intersecting said top surface to form cutting edges, the roughing insert having three separate convexly curved cutting edges forming an obtuse angle at each of said corners.

2. A cutting tool according to claim 1, wherein said three cutting edges of said roughing insert are symmetrically disposed relative to a geometric center of said roughing insert.

3. A cutting tool according to claim 1, wherein said three convexly curved cutting edges are intersected by a common imaginary circle inscribed within said insert such that three tangents drawn at such points of intersection form an equilateral triangle.

4. A cutting tool according to claim 3, wherein said finishing insert is generally triangular having three cutting edges, each of said cutting edges of said finishing insert being tangent to an imaginary second circle inscribed within said finishing insert, said first and second circles having equal radii.

5. A cutting tool according to claim 3, wherein each of said cutting edges of said roughing insert is defined by a radius, each of said radii being equal to one another and larger than a radius of said imaginary circle.

6. A cutting tool according to claim 1, wherein each of said three convexly curved cutting edges of said roughing insert intersects with another of said convexly curved cutting edges at a corner of said roughing insert to form an obtuse angle ranging from 120–140 degrees.

7. A cutting tool according to claim 1, wherein said finishing insert is generally triangular, having three cutting edges, said cutting edges of said finishing insert being symmetrical relative to a geometric center of said finishing insert.

8. A cutting tool according to claim 7, wherein each of said cutting edges of said finishing insert includes a linear main portion and a linear secondary portion which is inclined relative to said main portion and is shorter than said main portion, each corner of said finishing insert being formed by a main portion of one cutting edge and a secondary portion of another cutting edge.

9. A cutting tool according to claim 1, wherein said top surface of said finishing insert lies in a plane oriented parallel to a top surface of said holder, said roughing insert being inclined relative to said plane by an acute angle ranging from 2-4 degrees, such that a portion of said roughing insert disposed farthest from said finishing insert is spaced below said plane.

10. A cutting tool according to claim 1, wherein said top surface of said finishing insert lies in a plane coinciding with a top surface of said holder, said roughing insert being inclined relative to said plane by an acute angle ranging from 2-4 degrees, such that a portion of said roughing insert disposed farthest from said finishing insert is spaced below said plane.

11. A cutting tool according to claim 1, wherein said roughing insert and said finishing insert are so arranged in said toolholder that said roughing insert is engageable with a workpiece at a cutting depth that is several times larger than a cutting depth at which said finishing insert is engageable with the workpiece.

12. A cutting tool according to claim 1, wherein said roughing insert is positioned on said toolholder such that a corner of said roughing insert located farthest from a workpiece has a bisector forming an acute angle with a normal line extending perpendicularly to the workpiece.

13. A cutting tool according to claim 12, wherein said acute angle ranges from 5-25 degrees.

14. A cutting tool according to claim 12, wherein said acute angle ranges from 10-25 degrees.

15. A cutting tool according to claim 12, wherein said finishing insert is arranged such that an active cutting edge thereof forms a right angle with a normal line extending perpendicularly to the workpiece.

16. A cutting tool according to claim 1, wherein each of said roughing and finishing inserts includes a central aperture for the receipt of a clamping screw.

17. A cutting tool according to claim 6 wherein said radii of said cutting edges of said roughing insert are each substantially equal to a diameter of said imaginary circle.

18. A cutting tool according to claim 1 wherein each cutting edge of said roughing insert is of convex curvature continuously from one end of such cutting edge to the other, the convex curvature being defined by a constant radius.

19. A toolholder for bar peeling operations, said toolholder including both a multi-cornered polygonal roughing insert of wear resistant material, and a finishing insert, each of said roughing and finishing inserts including top and bottom surfaces and peripheral side surfaces extending therebetween, said side surfaces of each insert intersecting one another to define corners of said insert, said side surfaces of each insert intersecting said top surface to form cutting edges, the roughing insert having three separate convexly curved cutting edges forming an obtuse angle at each of said corners.

20. A toolholder according to claim 19 wherein each cutting edge of said roughing insert is of convex curvature continuously from one end of such cutting edge to the other, the convex curvature being defined by a constant radius.

* * * * *